United States Patent [19]

Donahue

[11] 4,037,857
[45] July 26, 1977

[54] ELEVATOR TONGUE FOR FARM IMPLEMENTS
[75] Inventor: James C. Donahue, Durham, Kans.
[73] Assignee: Donahue Corporation, Durham, Kans.
[21] Appl. No.: 740,823
[22] Filed: Nov. 11, 1976
[51] Int. Cl.² .............................................. B60D 1/00
[52] U.S. Cl. ................................ 280/478 B; 214/512
[58] Field of Search ............... 280/477, 478 R, 478 B, 280/482, 490 R, 490 A; 214/506, 512, 505; 172/605

[56] References Cited
U.S. PATENT DOCUMENTS 3,084,954  4/1963  Schlueter .................... 280/478 R X
3,201,144  8/1965  Smyser ........................... 280/477

Primary Examiner—Albert J. Makay
Attorney, Agent, or Firm—John A. Hamilton

[57] ABSTRACT

An elevator tongue for connection to the forward end of a farm implement having wheels at its rearward end, the tongue having cooperating elements respectively affixed to the vehicle and attachable to a tractor, and being relatively movable, when released to do so, in a forward and rearward direction, movement in one direction being operable to lower the forward end of the implement to rest on the ground, and movement in the opposite direction being operable to raise the forward end of the vehicle from the ground to a normal transport height.

8 Claims, 10 Drawing Figures

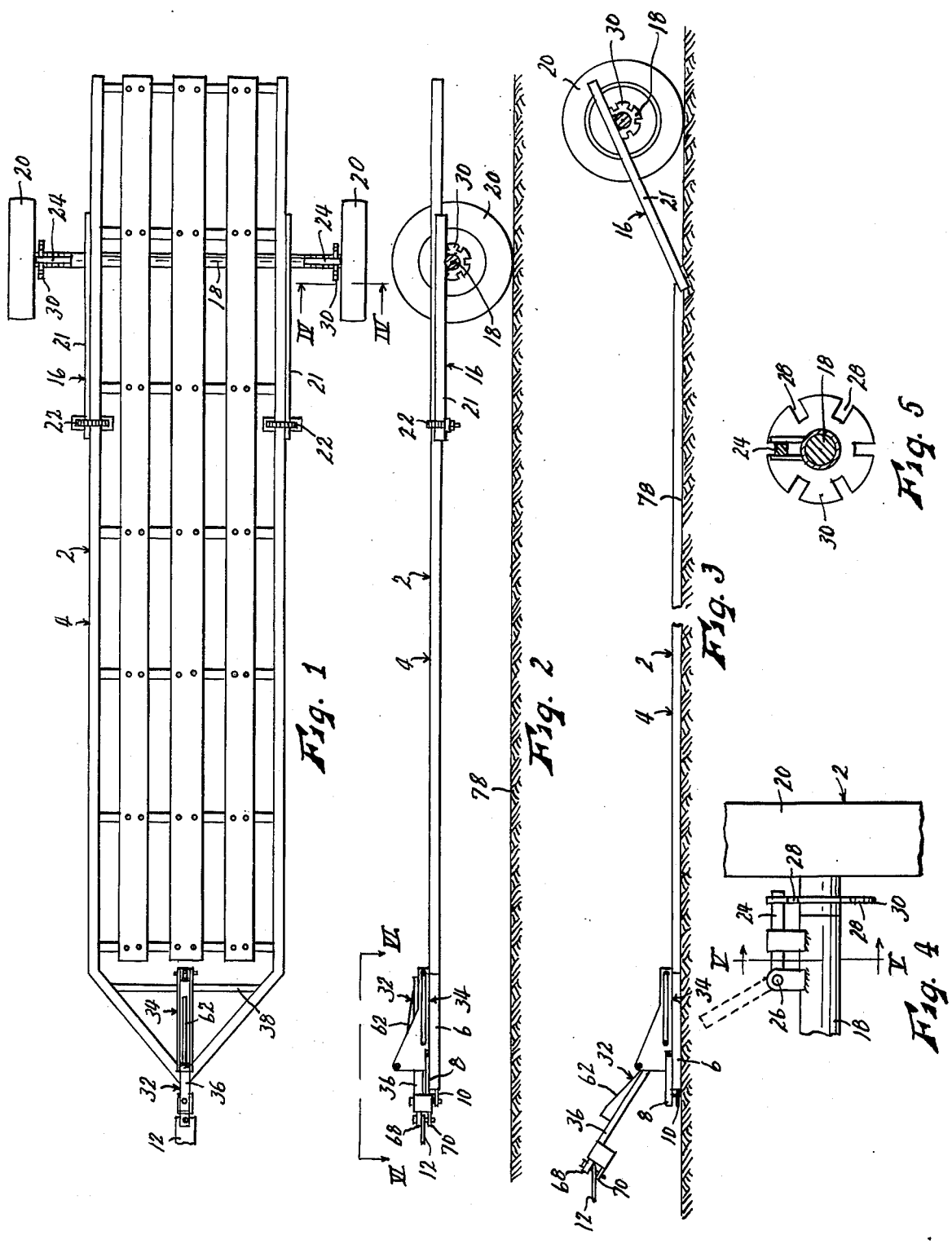

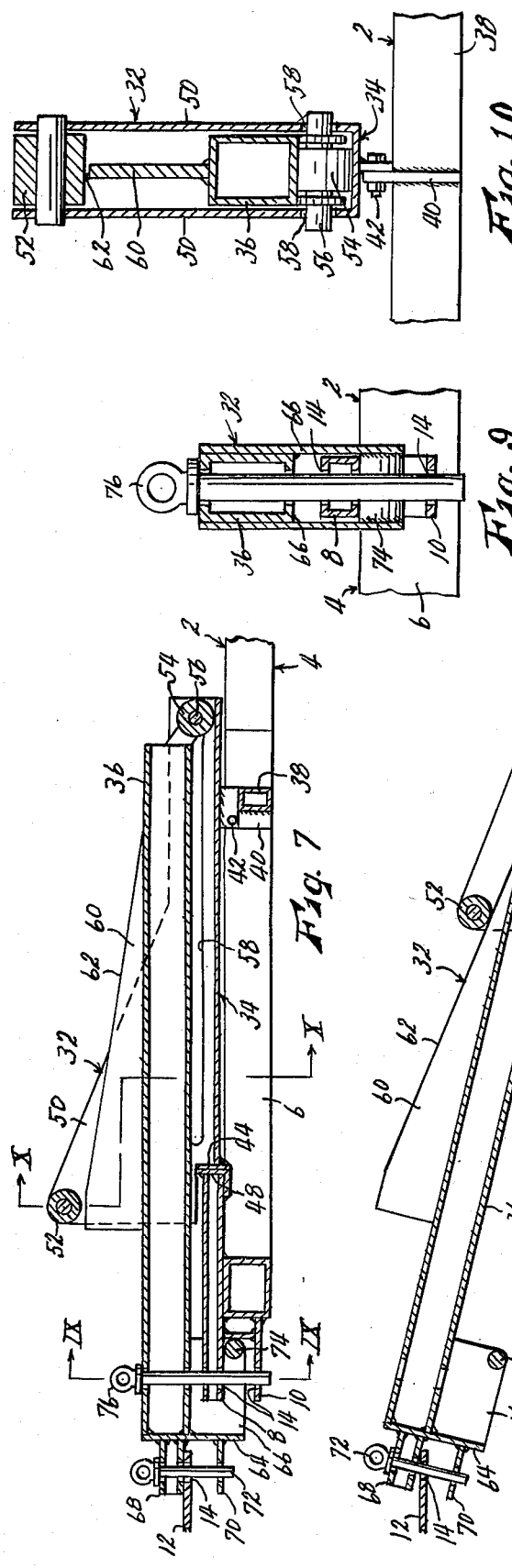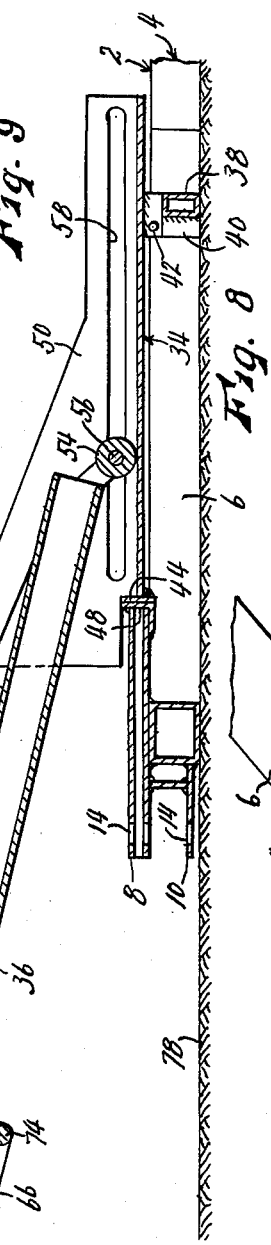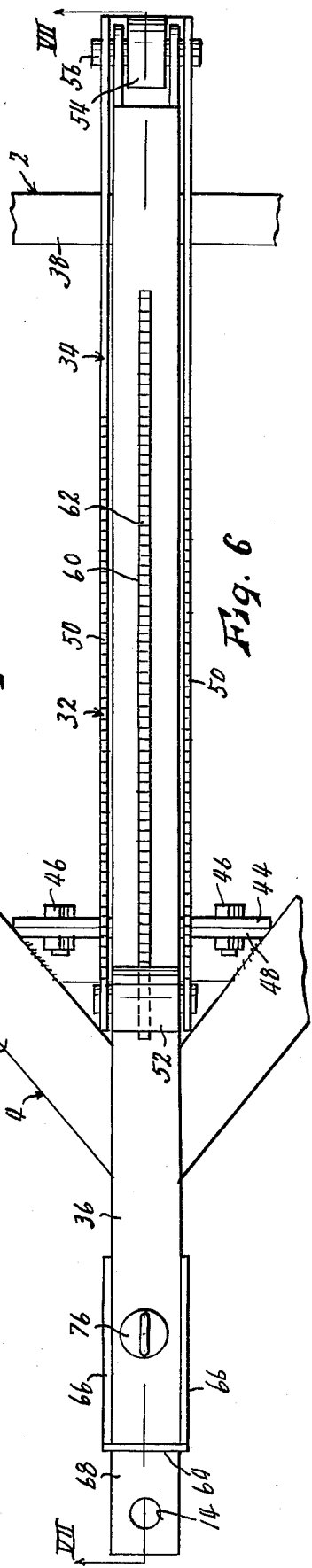

ELEVATOR TONGUE FOR FARM IMPLEMENTS

This invention relates to new and useful improvements in elevator tongues for farm implements, and may be considered an improvement over my own, prior U.S. Pat. No. 3,179,271, issued Apr. 20, 1965, but as will be readily apparent it has other uses and applications not necessarily dependent on or connected with the device shown in said prior patent.

The aforesaid prior patent contemplated a farm carrier including an elongated bed supported adjacent its rearward end by a wheeled carriage and having a fixed tongue at its forward end for attachment to a farm tractor or other towing vehicle. The bed could be moved forwardly relative to its carriage by the tractor, when the carriage was immobilized by locking its wheels against rotation. The carriage then formed a ramp sloping downwardly to the ground, down which the rearward end of the bed could slide to ground level. However, the tongue was then still attached to the tractor at a normal transport elevation above the ground, and the forward end of the bed could be lowered to the ground only by first detaching the tongue from the tractor, and then lowering the forward end of the bed by other means, which in the patent was illustrated as a manually operable jack. This was a tedious and time-consuming procedure, as was the opposite procedure of elevating the bed, which involved jacking up its forward end, attaching the tongue to the tractor, then backing the tractor to slide the rearward end of the bed up the carriage ramp. The intended function of the bed was to serve as a carrier for other heavy implements, which can easily be driven onto the bed when the latter is on the ground, then elevated to a transport elevation above the ground by raising the bed.

Accordingly, the primary object of the present invention is the provision of an elevator tongue which performs the function of raising and lowering the front end of the bed and which is not subject to the objectionable features of the previous system, in that it is simple and easy to operate, is powered solely by the tractor or other towing vehicle, and does not require detachment of the tongue from the tractor.

Generally, this object is accomplished by the provision of a tongue consisting of two relatively longitudinally movable sections, one fixed to the towed implement and the other to be attached to the tractor. These sections are releasably locked in generally coextensively overlapping relation, but when the lock is released, and the implement wheels are locked, forward movement of the tractor moves the tractor section of the tongue forwardly relative to the implement section thereof, and a ramp and roller arrangement connection the sections lowers the forward end of the implement gradually to the ground. Reverse motion of the tractor will correspondingly re-elevate the forward end of the implement.

Another object is the provision of an elevator tongue of the general character described which may be mounted as an accessory on any implement already equipped with a common fixed tongue.

It will be noted that while the present elevator tongue has been developed primarily for use in conjunction with the implement carrier shown in my aforesaid prior patent, it has utility in connection with many other types of wheeled implements.

With these objects in view, as well as other objects which will appear in the course of the specification, reference will be had to the accompanying drawing, wherein:

FIG. 1 is a top plan view of a farm implement carrier generally as shown in may prior U.S. Pat. No. 3,179,271, but equipped with an elevator tongue embodying the present invention, shown in its elevated position, FIG. 2 is a side elevational view of the carrier as shown in FIG. 1, FIG. 3 is a view similar to FIG. 2, but with the bed of the carrier lowered to rest on the ground, partially broken away and foreshortened, FIG. 4 is an enlarged, fragmentary sectional view taken on line IV—IV of FIG. 1, with the vehicle tire left in elevation, FIG. 5 is a sectional view taken on line V—V of FIG. 4, FIG. 6 is an enlarged, fragmentary top plan view of the elevator tongue forming the subject matter of the present invention, as indicated by line VI—VI of FIG. 2, FIG. 7 is a reduced sectional view taken on line VII—VII of FIG. 6, FIG. 8 is a view similar to FIG. 7, but showing the elevator tongue operated to lower the forward end of the carrier bed to rest on the ground, FIG. 9 is an enlarged sectional view taken on line IX—IX of FIG. 7, and FIG. 10 is an enlarged, sectional view taken on line X—X of FIG. 7.

Like reference numerals apply to similar parts throughout the several views, and the numeral 2 applies generally to a farm implement carrier which has been selected as a device in connection with which to show my elevator tongue, although it will be readily apparent that said tongue may be used in connection with many other types of wheeled devices for general use. Carrier 2 includes a flat rectangular bed 4 of any suitable construction, elongated in the direction of carrier travel, the foward end portion of which forms a tapered tongue 6 to the forward end of which are affixed a pair of vertically spaced apart hitch members 8 and 10 which ordinarily would be detachably connected to the draft bar of a tractor 12 by a vertical hitch pin inserted downwardly through matching holes 14 formed through said hitch members and said draft bar, with said draft bar disposed between said hitch members. Bed 4 is supported adjacent its rearward end by a wheeled carriage 16 consisting of a fixed axle 18 extending transversely beneath the bed and having a ground-engaging wheel 20 rotatably mounted at each end thereof, and a pair of parallel, elongated angle-iron slides 21 affixed at right angles to said axle and extending both forwardly and rearwardly therefrom. Bed 4 rests in said slides, and is slidably movable forwardly and rearwardly therein, although it may be releasably secured against said sliding movement by any suitable means such as chain locks 22. Each wheel 20 may also be locked against rotation relative to the axle by a lock bar 24 (see FIGS. 4 and 5) pivoted to axle 18 at 26 and movable between an unlocking position, shown in dotted lines in FIG. 4, and a locking position, shown in solid lines in FIGS. 4 and 5, in which it engages in any one of a series of peripherally spaced notches 28 formed in a disc 30 fixed to and rotatable with the associated wheel 20.

The structure thus far described in shown in my prior U.S. Pat. No. 3,179,271, and reference may be had to said patent for further details thereof. It will be seen that when hitch members 8 and 10 are connected to a tractor as described, chain locks 22 released, and wheel locking bars 24 engaged, then forward movement of the tractor will cause bed 4 to slide forwardly in angle iron slides 21, and when the rearward end of the bed passes forwardly over the axle, said slides will incline downwardly to engage the ground, and the rearward end of the bed will move downwardly along the slides to rest on the ground, as shown in FIG. 3. Rearward movement of the tractor will slide the bed up the slides to its original position, whereupon chain locks 22 may be re-engaged, lock bars 24 disengaged, and the carrier towed over the ground in the usual manner.

The present invention contemplates the provision of a forward elevator tongue, also powered by forward and rearward movement of the tractor, for raising and lowering the forward end of bed 4 to and from ground level. Said elevator tongue is indicated generally by the numeral 32, and includes a track member 34 and a draft beam 36. Track 34 is disposed horizontally along the midline of bed 4, just above said bed. Referring to FIGS. 6 - 10, it will be seen that track 34 is affixed releasably adjacent its rearward end to a cross bar 38 forming a rigid element of bed 4, by means of a bracket 40 and bolt 42. Adjacent its forward end, said track is provided with a transverse head plate 44, rigidly affixed thereto, which is detachably connected by bolts 46 to a matching plate 48 forming a rigid element of bed 4. Plate 48 served as a mounting for the manually operable jack previously used to raise and lower the forward end of the bed, as shown in my prior patent. Track 34 is provided with parallel, vertical side walls 50. The forward end portions of said side walls extend to a substantial height above the track, and a roller 52 is mounted between the upper edge portions thereof for rotation on a horizontal transverse axis.

Beam 36 extends forwardly and rearwardly above track 34, carrying at its rearward end a roller 54 rotatable on a horizontal transverse axle pin 56 mounted on said beam. Roller 54 engages track 34, and axle pin 56 extends transversely outwardly through slots 58 formed in side walls 50 of the track, said slots being horizontally elongated to permit forward and rearward movement of the beam relative to the track, but to prevent disengagement thereof from the track. The beam extends forwardly between said walls 50, projecting at all times forwardly of the hitch members 8 and 10 of bed 4, and is disposed beneath roller 52. Welded or otherwise fixed to the top surface of the beam is an upstanding planar plate 60 extending parallel to said beam, the upper edge 62 of said plate being inclined downwardly and rearwardly and serving as a ramp cooperating with roller 52, as will presently appear.

Welded to the forward end of beam 36 is a vertical face plate 64 and a pair of side plates 66 extending rearwardly from said face plate. Welded to said face plate are a pair of forwardly extending, vertically spaced apart hitch members 68 and 70 corresponding in all respects to hitch members 8 and 10 of bed 4, and adapted to be connected to tractor draft bar 12 by a vertical hitch pin 72. Welded to and extending transversely between side plates 66, in spaced relation behind the face plate, is a heavy bar 74. When beam 36 is moved to its rearward limit relative to track 34 bar 74 enters between the hitch members 8 and 10 of bed 4, as best shown in FIG. 7. At that time, the beam may be secured against longitudinal movement relative to the track by a vertical hitch pin 76 inserted downwardly through matching holes formed therefor in beam 36 and hitch members 8 and 10, said hitch pin passing forwardly of bar 74. Preferably, bar 74 is disposed at such an elevation that it supports the entire weight imposed on hitch member 8, and elevates roller 52 slightly above ramp surface 62 of plate 60, as shown in FIG. 7.

In operation, it will be seen that FIG. 7 shows the elevator tongue elements in the relative positions assumed in the normal transport of a load carried by bed 4, with beam 36 in its rearmost position relative to track 34, and secured in that position by pin 76. At this time, bed 4 is disposed horizontally and at its normal transport elevation above the ground to provide adequate ground clearance.

To lower the forward end of bed 4 to rest on the ground, regardless of whether its rearward end has been lowered by slides 21 of carriage 16 or not, wheel lock bars 24 are engaged to secure wheels 20 against rotation, and hitch pin 76 is removed. The tractor or other towing vehicle to which draft bar 12 forms an element is then driven forwardly. This moves beam 36 forwardly relative to track 34, since the track is affixed to bed 4, the forward motion of which is inhibited by wheel locks 24. As soon as cross bar 74 of the beam clears the forward end of hitch member 8, roller 52 falls into engagement with ramp 62, so that the entire weight of the forward end of bed 4 is supported by the force moment exerted thereby on beam 36 through rollers 52 and 54. As forward movement of the tractor, and of course beam 36, is continued, roller 54 rolls forwardly along track 34, and roller 52 rolls downwardly along ramp surface 62, so that the forward end of bed 4 is gradually lowered to rest on the ground surface 78, as best shown in FIG. 8. The extension of axle pin 56 of roller 54 through slots 58 of slide walls 50 of track 34 prevents beam 36 from being pulled forwardly to a sufficient degree to disengage it from the track in the event of accidental forward overtravel of the tractor. The connection of the forward end of the beam to the tractor by hitch pin 72 permits ample vertical pivoting of the beam to permit it to remain engaged in track 34 when bed 4 rests on the ground, as shown. To reelevate the forward end of bed 4 to transport level, the tractor is merely reversed and driven rearwardly. This causes rollers 52 and 54 to cam track 34 and beam 36 into their original generally parallel relation to elevate the forward end of the bed. During the final portion of the rearward movement of the beam relative to the track, cross bar 74 of the beam enters under hitch member 8 of the bed, camming it slightly upwardly to raise roller 52 out of engagement with ramp surface 62, whereupon hitch pin 76 may be reinserted and wheel locks 24 sidengaged to permit normal towing of the carrier.

Thus it will be apparent that an elevator tongue having several advantages has been produced. It is operable to lower the forward end of an implement bed gently to the ground, where said bed is either quite heavy or is supporting a heavy load, any to again re-elevate it to a normal transport elevation above the ground, with power supplied solely by a tractor or the like used to tow said implement. It requires no other power means, nor any manually operable lifting devices such as jacks. It is economical in construction, and both simple and convenient in operation. It does not require detachment of the implement from its towing vehicle. While it could be included with the implement as original equipment, serving as the sole towing tongue of the implement, it may also, as shown, serve as an accessory for an implement already equipped with the usual rigid tongue. And while the elevator tongue is shown in connection with an implement bed which is also equipped with elevator means for raising and lowering its rearward end, and has perhaps special utility in connection with such an implement bed, it will be apparent also that the elevator tongue shown has utility in connection with other implement beds not equipped with elevator means at their rearward ends, for example beds onto which loads may be driven from their forward ends, after their forward ends are lowered by the present elevator tongue.

While I have shown and described a specific embodiment of my invention, it will be readily apparent that many minor changes of structure and operation could be made without departing from the spirit of the invention.

What I claim as new and desire to protect by Letters Patent is:

1. In combination with a vehicle bed having ground-engaging wheels adjacent its rearward end supporting said bed in spaced relation above the ground, and being connectable at its forward end to a towing vehicle at generally the same elevation above the ground, an elevator tongue for connecting said vehicle bed to said towing vehicle, said tongue comprising:
   a. a horizontal, upwardly facing track affixed to said bed adjacent its forward end and extending parallel to the line of travel of said bed,
   b. a beam normally parallel, generally coextensive with, and above said track, and having means at its rearward end supported on said track for movement therealong,
   c. a ramp affixed to said beam thereabove and sloping downwardly and rearwardly,
   d. supporting means rigidly associated with said track and movably engaging said ramp forwardly of the rearward end of said beam,
   e. releasable beam locking means securing said beam against forward movement relative to said track, and
   f. means for connecting the forward end of said beam to said towing vehicle for vertical pivotal movement relative thereto, whereby when said locking means is released and said towing vehicle is driven forwardly, said beam is moved forwardly relative to said track, and said supporting means, acting in cooperation with said track and said ramp, lower the forward end of said bed to rest on the ground.

2. An elevator tongue as recited in claim 1 wherein said means supporting the rearward end of said beam on said track, and said supporting means engaging said ramp, constitute a pair or rollers carried respectively by said beam and said track for rotation on horizontal axes transverse to the vertical plane of the relative movement between said beam and said track.

3. An elevator tongue as recited in claim 2 wherein said roller carried by said beam and engaging said track is rotatably mounted on an axle pin, said axle pin extending transversely outwardly from said beam and being engaged in slots provided therefor in said walls of said track, whereby said beam is secured in assembly with said track, said slots being elongated parallel to said track to permit relative movement of said track and said beam.

4. An elevator tongue as recited in claim 1 with the addition of brake means operable to inhibit horizontal movement of said bed relative to the ground.

5. An elevator tongue as recited in claim 4 wherein said brake means constitutes manually operable locks operable selectively to lock said ground-engaging wheels against rotation relative to said bed, or to free them for rotation relative to said bed.

6. An elevator tongue as recited in claim 1 wherein said track is detachably connected to said bed, whereby said elevator tongue may be connected as an add-on accessory to beds not originally so equipped.

7. An elevator tongue as recited in claim 1 wherein said means for connecting the forward end of said beam to said towing vehicle comprises:
   a. a pair of forwardly extending, vertically spaced apart hitch members fixed at their rearward ends to said beam, and adapted to receive the draft bar of said towing vehicle loosely therebetween, and
   b. a hitch pin insertable downwardly through loosely fitting apertures formed therefor in said hitch members and said draft bar, whereby said beam may pivot in a vertical plane with said hitch pin acting as a fulcrum.

8. An elevator tongue as recited in claim 1 for use in connection with a vehicle bed equipped at its forward end with a rigid tongue consisting of a pair of forwardly extending, vertically spaced apart hitch members adapted to receive the draft bar of a towing vehicle therebetween, and vertically apertured to receive therethrough a vertical hitch pin; wherein said beam extends forwardly of said bed hitch members at all times and is provided at its forward end with hitch members corresponding to said bed hitch members, and with a transverse cross bar behind its hitch members, said cross bar being positioned to enter between said bed hitch members when said beam is in its rearmost position relative to said track; wherein said beam locking means comprises a pin insertable through apertures formed therefor in said beam, and through the apertures of said beam hitch members, when said beam is in said rearmost position; and wherein said track is detachably connected to said bed.

* * * * *